United States Patent [19]

Codino

[11] Patent Number: 4,569,849
[45] Date of Patent: Feb. 11, 1986

[54] PROCESS FOR MAKING LASAGNA

[76] Inventor: Leno Codino, 8 Rivercrest Dr., Rexford, N.Y. 12148

[21] Appl. No.: 683,356

[22] Filed: Dec. 19, 1984

[51] Int. Cl.⁴ .................................................. A23L 1/16
[52] U.S. Cl. ...................................... 426/275; 426/496; 426/502; 426/516; 426/517; 426/144; 426/94
[58] Field of Search ............... 426/275, 283, 391, 451, 426/497, 504, 517, 144, 516, 512, 502, 496, 274, 282, 556, 557, 558; 99/450.6, 450.7; D1/125, 126

[56] References Cited

U.S. PATENT DOCUMENTS

| | | | |
|---|---|---|---|
| 1,844,142 | 2/1932 | Barili | 99/450.7 |
| 2,686,720 | 8/1954 | Rosa | 426/144 |
| 3,468,675 | 9/1969 | Potzl | 426/517 |
| 3,605,641 | 7/1969 | Shuster | 99/450.7 |
| 3,798,343 | 3/1974 | Vitale | 426/502 |
| 4,275,647 | 6/1981 | Chambers | 426/283 |
| 4,416,910 | 11/1983 | Hayashi et al. | 426/283 |
| 4,418,085 | 11/1983 | Becquelet | 426/502 |

*Primary Examiner*—Steven Weinstein
*Assistant Examiner*—Carolyn Paden
*Attorney, Agent, or Firm*—Schmeiser & Morelle

[57] ABSTRACT

A process for preparing precooked lasagna in which the ingredients are mixed and then extruded to form at least two uncooked strips of pasta. After passing the strips through the cooker, they are deposited into a cooling tank where they are allowed to accumulate. A separator and guide means aligns the noodles on top of one another as they pass out of the cooling tank. The noodles are then passed above and below the nozzle where a filler material is deposited between the strips. The strips are then cut for packaging.

4 Claims, 6 Drawing Figures

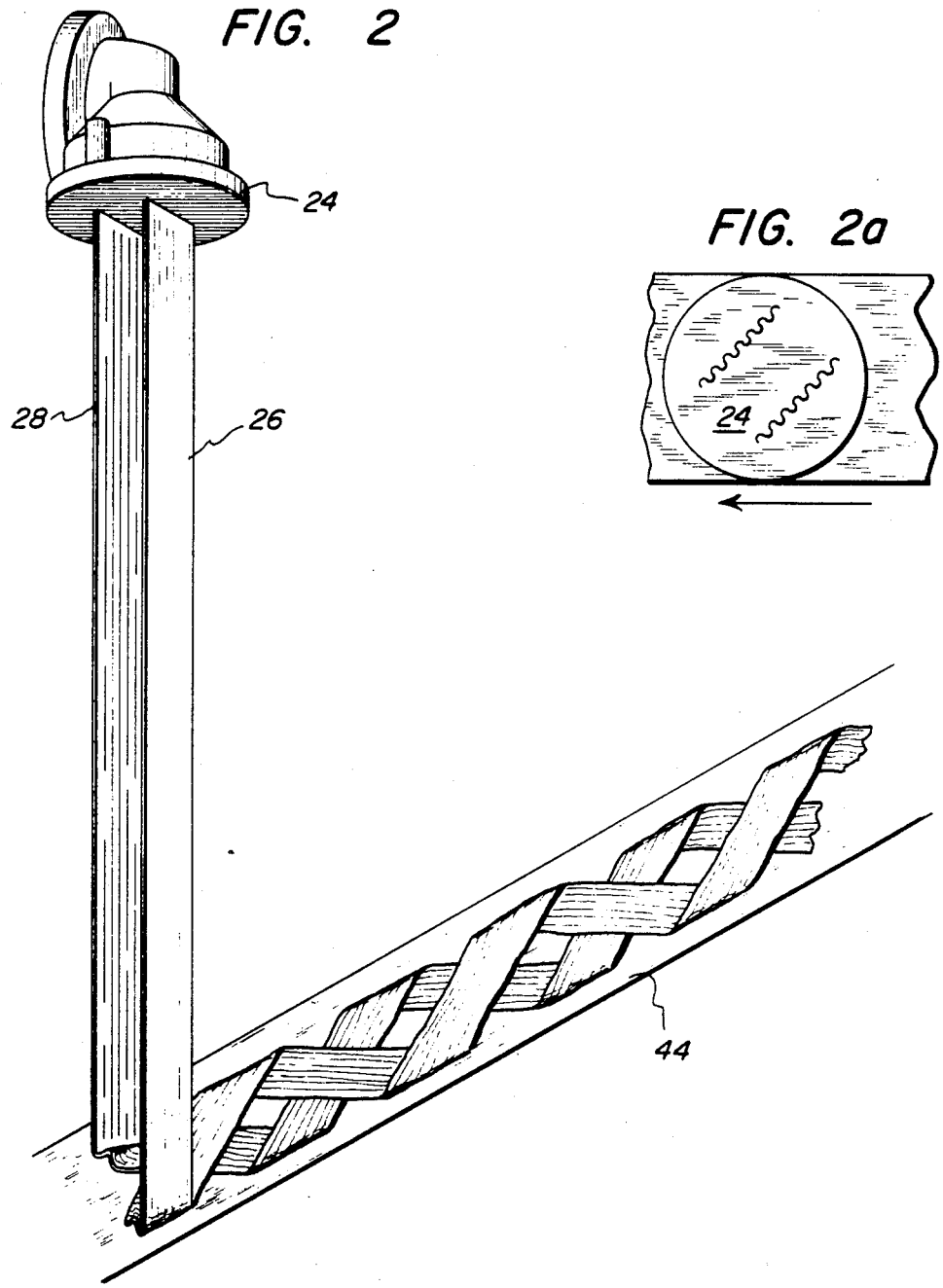
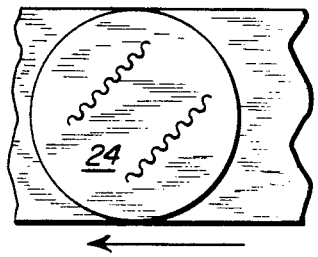

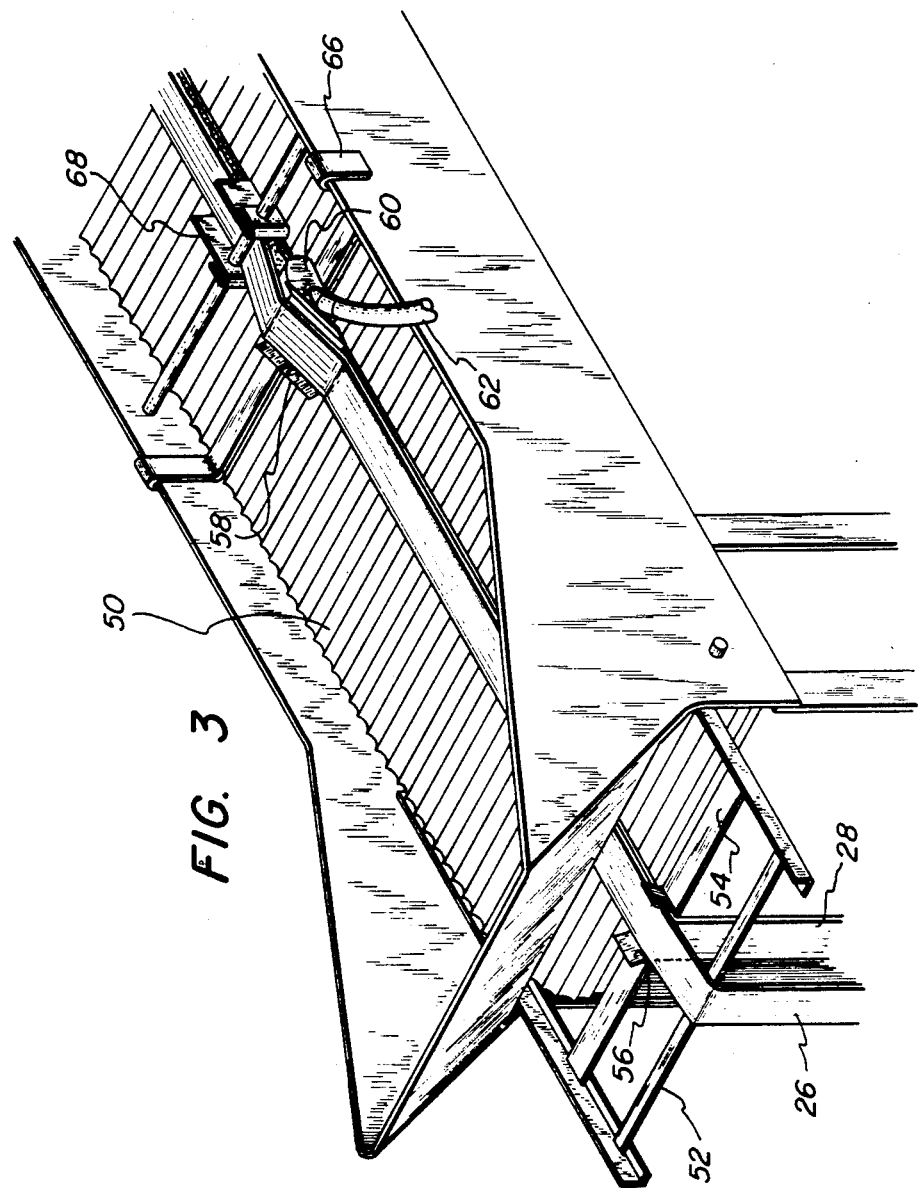

PROCESS FOR MAKING LASAGNA

FIELD OF THE INVENTION

Generally, this invention relates to a machine and process for producing a new precooked lasagna product. More specifically, this is a continuous asynchronous process for creating a lasagna product wherein the noodles are corrugated and have scalloped edges.

BACKGROUND AND SUMMARY OF THE INVENTION

The production of flour based products has served as a staple food source from times too early to determine. Somewhat similarly, the automated production of pasta products has also received a great deal of attention over an extended number of years. These devices have covered a variety of applications from the production of simple uncooked pasta to the production of precooked stuffed pasta products such as manicotti and ravioli.

While the production of products such as these has received a significant amount of attention during the years, the production of the product known as lasagna appears to have received much less consideration. Thus, while broad lasagna type noodles are produced in large quantities, the responsibility falls upon the purchaser to cook the noodles and layer them with other substances such as meat, cheese and sauce in order to produce the finished product which is then baked. With the demands of today's society, and the general appeal that lasagna has to the public, there is little doubt that an easy to prepare yet quality lasagna product is desirable.

When considering the state of the art, several reasons for the failure to economically produce such a product are suggested. Since the lasagna product is not enclosed as other pasta type products, it is necessary to work with separate continuous strips of pasta noodles. In order to provide a filling between these separate noodle strips, various alignment steps must be performed. To do this economically, it is preferable to deal with the separate strips as a single unit and avoid the use of separate hoppers and extruders as has been done in the past. The difficulty becomes more evident when as in the present invention, one wishes to provide a precooked product. Since it is not desirable to cook the product after the filling has been introduced and since most prior art devices that deal with more than one strip use separate hoppers for each strip, it would be necessary to join the strips for cooking, or use separate cooking means, then separate the strips for filling and rejoin them. In addition to the difficulties encountered in aligning separate noodle strips, as the process is extended to include steps such as extruding, cooking, filling and cutting, breakage of the strips becomes a difficulty. Should one seek to overcome this difficulty by providing slack in the noodle strips for an asynchronous process, greater difficulties in alignment are encountered.

I also found that when providing a precooked, ready to bake lasagna product, other difficulties are encountered in the production of a product satisfactory to the ultimate consumer. The individual who makes his own lasagna product has little or no difficulty distributing the filling substances such as meat, cheese, and sauce evenly upon the layers of noodles. However, when the product is precooked and purchased frozen, there is little or no opportunity to evenly distribute the ingredients without trying to separate the product into its components. Thus, whereas other manufacturers of noodle strips seek to inhibit the flow of sauce, since the preparer is applying the sauce where he desires it to be, the producer of a precooked lasagna product must have a noodle strip configuration that assists and enhances the flow of sauce without the ultimate consumer having to separate the product. In addition, the filling between the noodle strips must be consistent and even throughout the product.

With these ideas in mind, I began working on my invention. The approach which led me to the development of my present invention was the realization that the use of slack in the noodle strips for the asynchronous production of the product would aid in the simultaneous production of the strips and help avoid breakage if the strips could be properly aligned prior to filling.

It was, therefore, an object of this invention to provide a machine for the continuous asynchronous production of a precooked lasagna product.

Another object of this invention was to provide such a machine which would limit breakage of the noodles and thus avoid the need to interrupt the process.

Another object of this invention was to provide a machine which would produce a precooked lasagna product wherein the inner filling was continuous and evenly distributed.

Another object of this invention was to provide a precooked lasagna product which enhanced sauce migration and flow.

Other objects of this invention will become apparent to those familiar with this field as the detailed description is considered.

BRIEF DESCRIPTION OF THE DRAWINGS

FIGS. 2 and 2a is an elevational view of the extruder and one of the conveyor transfer mechanisms.

FIG. 3 is a perspective view of the noodle strips alignment and filling mechanism.

DETAILED DESCRIPTION OF THE DRAWINGS

Figure 1:
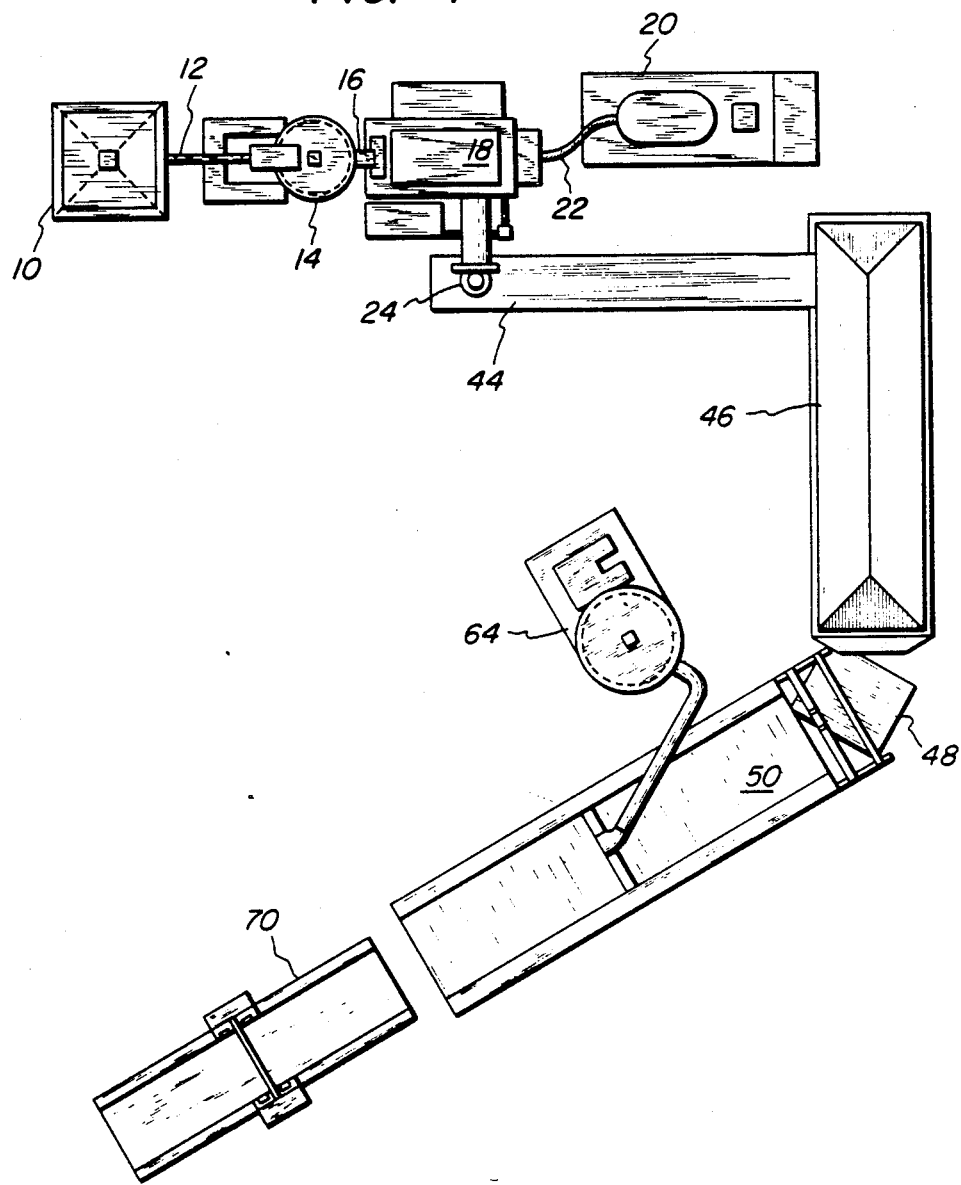
FIG. 1 is a top view of the production assembly.

FIG. 1 discloses a holding bin 10 which contains semolina or another flour type substance. The semolina is drawn through a tubing 12 into a measuring device 14.

This measuring device may be varied in order to adjust the amount of flour being delivered through pipe 16 into the mixer 18.

Simultaneously, a second holding bin 20 which is generally filled with eggs is delivering the egg product through a second pipe 22 into the mixer 18.

The delivery rates of the semolina and the egg are varied by means which are well known in the art in order to achieve the desired consistency.

Once the desired consistency is achieved, the mixture is directed through an extruder 24 which is shown in greater detail in FIG. 2. The product being extruded is an uncooked continuous noodle strip.

As shown in FIG. 2a, the die of the extruder is fashioned so as to produce a first noodle strip 26 and second noodle strip 28. More particularly, the die is designed so as to form noodle strips having longitudinal corrugations 30 and scalloped edges, which for the purpose of this application will be used to mean a wavy or sinusoidal edge, having projections both above and below the longitudinal corrugations (see FIG. 4).

Figure 4:
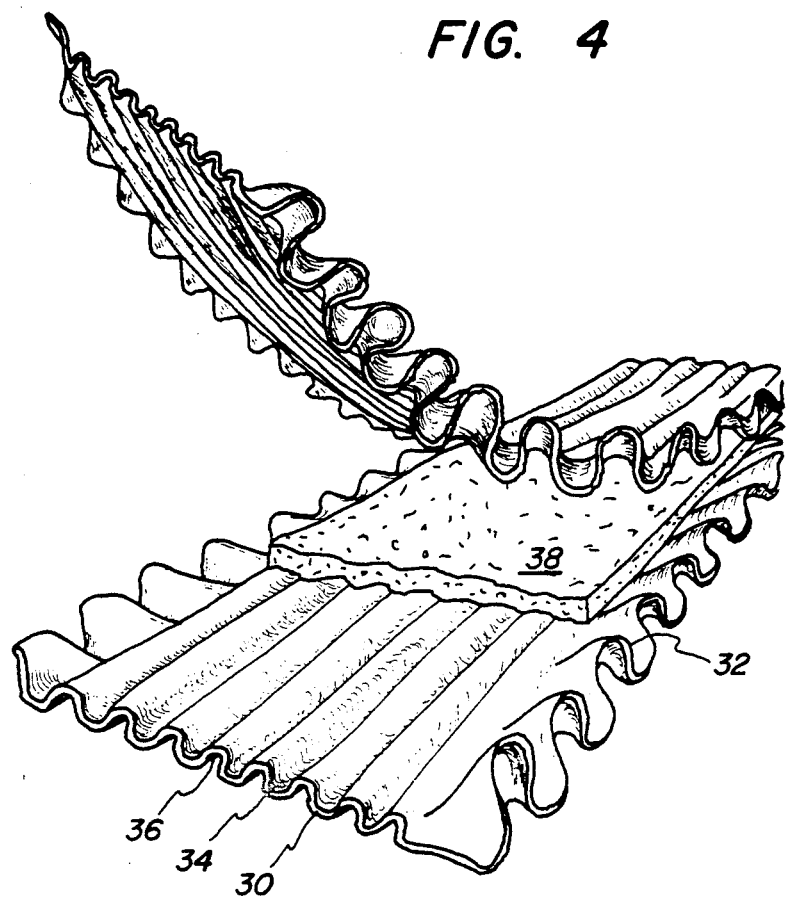
FIG. 4 is a perspective view of the product of this invention.

The longitudinal corrugations 30 form channels 34 and crests 36. The depth of the channels measured from the crests varies from 1/16 to ¼ of an inch. This depth enables most of the channels 34 to stay open even after a filler 38 is placed thereon. Thus, sauce migration along the noodle is aided despite the filler material. As also shown in FIG. 4, the scalloped edges 32 serve to direct the sauce applied along the edges of the noodle in toward the channels.

Figure 5:
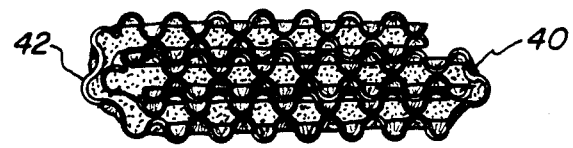
FIG. 5 is a side elevational view of the product of this invention.

FIG. 5 discloses the end product wherein the lasagna is folded in a "e" shape. In this configuration, the scalloped edges serve to hold the noodle strips apart from each other for better sauce migration. The resiliency of the noodles at turns 40 and 42 also aid to hold the strips apart from each other. Thus, when the product is packaged and frozen in this manner, the ultimate user can take the frozen precooked lasagna and simply pour sauce over it and still get sufficient migration of the sauce to have the sauce channel throughout a substantial amount of the product.

As shown in FIG. 2, the noodles are extruded onto a first conveyor belt 44. This first conveyor 44 transports the two continuous noodle strips to a cooker 46. As known by those familiar with the art, the cooker 46 also has a conveyor belt (not shown) which carries the noodles through the cooker at a predetermined rate in order to assure complete cooking of the noodles. After exiting the cooker, the noodles are deposited into a cooling tank 48. In my preferred embodiment, the cooling tank is simply filled with water and is of a sufficient size to hold a large amount of noodles. By having a large amount of noodles within the cooling tank, not only is the cooling and congealing process better established, but the system becomes asynchronous since there is a great deal of latitude in the amount of excess noodles that are stored within the tank. This excess of noodles in the tank also serves to allow the machinery to be articulated at this point which can save substantially in the amount of room required to perform this process.

In initially setting up the process, the end of each noodle is directed out of the cooling tank and over a set of bars in the manner shown in FIG. 3.

As shown in FIG. 3, this set of bars extends outwardly from a second conveyor belt 50 such that the bars are suspended over the cooling tank 48. The set of bars has a first bar 52 and a second bar 54 which are parallel to each other and are at least one foot above the cooling tank. In my preferred embodiment, these bars are actually 18 inches above the cooling tank. This allows the noodles to unwind as they are drawn out of the cooling tank and over the bars, thereby aligning the noodle strips axially. In order to accomplish this, the strips must be separate. Therefore, the first noodle strip 26 passes over the first bar 52 and then proceeds over the second bar 54, whereas the second noodle strip rises out of the tank and only passes over the bar 54.

A guide 56 is attached to the second bar 54 and serves to align the first noodle strip 26 on top of the second noodle strip 28.

The noodle strips travel along the second conveyor belt 50 in this fashion until they come to an inclined separator 58 which is suspended a sufficient distance above the second conveyor belt 50 to allow the second noodle strip 28 to pass under the inclined separator while the first noodle strip 26 passes over the inclined separator. Immediately after the inclined separator and prior to the noodles' joining together, there is a nozzle 60 which is attached by means of a tube 62 to a hopper 64.

The hopper is filled with a predetermined filler such as cheese and serves to deposit a continuous strip of cheese onto the second noodle strip 28. The second noodle strip passes under the nozzle 60 which is suspended by means of a bracket 66 slightly above the second conveyor belt 50. After filling, the noodle strips pass through a second guide 68 which serves to assure alignment of the first noodle strip on top of the second noodle strip.

The precooked lasagna product then passes to a cutter 70 where the noodles are cut into strips of predetermined length. In my preferred embodiment, the noodle is then folded in a "e" shape as shown in FIG. 5. After folding, the noodle is packaged and frozen so that the ultimate consumer need only add sauce and bake the product.

In operation, the consistency of the semolina and egg mixture is set and the mixture is then passed through an extruder 24. The die assembly of the extruder is waved so as to produce noodle strips having longitudinal corrugations 30 and scalloped edges 32. A first conveyor belt 44 directs the first noodle strip 26 and the second noodle strip 28 to a cooker 46 wherein the cooker conveyor belt passes these strips through the cooker at a predetermined rate in order to properly cook the noodles. After passing through the cooker, the noodle strips are deposited into a cooling tank. When the process is being initially instituted, the individual running the process will allow a significant amount of noodles to accumulate in the tank. Generally, somewhere in the neighborhood of twenty feet of noodle strips is a sufficient amount to be deposited in the tank. The individual then takes one of the noodle strips, which for the sake of description will be called the second noodle strip, and passes it up from the tank over a second bar 54 and onto a second conveyor belt 50. Almost simultaneously, the first noodle strip 26 is directed up from the cooling tank 48 and over both a first bar 52 and the second bar 54. The strips are aligned so as to pass through a guide 56 which is secured to the second bar 54 and assures that the first noodle strip is positioned on top of the second noodle strip. The first noodle strip is then directed above an inclined separator 58 while the second noodle strip is passed below the separator. Similarly, the first noodle strip is passed over the nozzle 60 while the second noodle strip is passed under the nozzle. The pump (not shown) from the hopper 64 then directs a filling substance such as cheese through tube 62 and out of nozzle 60. The cheese is deposited onto the second noodle strip after which the first noodle strip descends over the nozzle 60, thereby creating a lasagna type sandwich. A second guide 68 assures that the first noodle strip 26 is aligned directly over the second noodle strip 28. The noodles with filler then move to a cutter where they are cut into predetermined lengths. These lengths can vary significantly, but generally I found that lengths of 6 to 10 inches are preferable.

After cutting, the product is folded into a "e" shape and packaged and frozen. The shape of the broad, lasagna type noodles is important in assisting the ultimate consumer in preparing the lasagna. The scalloped edges of the noodles as well as the use of the "e" shape provides openings between the noodle strips that are in contact with each other. Also, because the noodle is longitudinally corrugated with channels from 1/16 to ¼ inch in depth, sauce applied over the frozen product will be directed into the channels and will generally spread out substantially evenly during baking. In addition, the choose filler will generally not fill the corrugations, and therefore, sauce applied to the product will migrate along the channels and below the cheese. As soon as the product is baked, it is ready to be consumed.

While the above describes the preferred embodiment of this invention, it should be appreciated that various changes can be made without departing from the scope of the invention which is intended to be limited only by the appended claims.

I claim:

1. A continuous asynchronous process for making precooked lasagna comprising the following sequential steps:
    extruding at least two continuous strips of uncooked broad lasagna type noodles onto a conveyor;
    cooking the strips as they are being continually passed through a cooking means;
    collecting the noodle strips in a cooling tank;
    drawing the strips from the cooling tank while leaving a predetermined amount of noodles in the tank to provide slack for asynchronous operation of the process;
    separating the continuous strips from each other as they are drawn from the tank;
    aligning one of the strips on top of the other strip in a horizontal orientation;
    passing the top strip over and the bottom strip under a nozzle;
    feeding a substance through the nozzle, thereby creating a filling between the strips; and
    cutting the strips into lengths of predetermined size.

2. The invention of claim 1 wherein said separating step includes the step of suspending the strips vertically, at least twelve inches above the cooling tank to allow the strips to unwind.

3. The invention of claim 1 wherein the extruding step includes scalloping the edges of the strips.

4. The invention of claim 3 wherein the extruding step also includes corrugating the noodles longitudinally.

* * * * *